US008423597B1

(12) United States Patent
Ho et al.

(10) Patent No.: US 8,423,597 B1
(45) Date of Patent: Apr. 16, 2013

(54) METHOD AND SYSTEM FOR ADAPTIVE MATRIX TRIMMING IN AN INVERSE DISCRETE COSINE TRANSFORM (IDCT) OPERATION

(75) Inventors: Yiu Cheong Ho, Fremont, CA (US); Eric Kwong-Hang Tsang, Milpitas, CA (US)

(73) Assignee: NVIDIA Corporation, Santa Clara, CA (US)

( * ) Notice: Subject to any disclaimer, the term of this patent is extended or adjusted under 35 U.S.C. 154(b) by 1167 days.

(21) Appl. No.: 10/928,083

(22) Filed: Aug. 27, 2004

Related U.S. Application Data (60) Provisional application No. 60/499,044, filed on Aug. 29, 2003.

(51) Int. Cl.
*G06F 17/14* (2006.01)
(52) U.S. Cl.
USPC .......................................................... 708/402
(58) Field of Classification Search ........... 708/400–409
See application file for complete search history.

(56) References Cited

U.S. PATENT DOCUMENTS

| | | | |
|---|---|---|---|
| 4,385,363 A | 5/1983 | Widergren et al. | |
| 4,583,164 A | 4/1986 | Tolle | |
| 4,829,465 A | 5/1989 | Knauer | |
| 5,045,940 A | 9/1991 | Peters et al. | |
| 5,130,797 A | 7/1992 | Murakami et al. | |
| 5,146,324 A | 9/1992 | Miller et al. | |
| 5,206,822 A * | 4/1993 | Taylor ........................... | 708/607 |
| 5,285,404 A | 2/1994 | Satou | |
| 5,301,136 A * | 4/1994 | McMillan et al. ............. | 708/402 |
| 5,387,982 A * | 2/1995 | Kitaura et al. ................. | 708/401 |
| 5,471,412 A | 11/1995 | Shyu | |
| 5,576,958 A * | 11/1996 | Kawakatsu et al. ........... | 708/402 |
| 5,596,369 A | 1/1997 | Chau | |
| 5,623,311 A | 4/1997 | Phillips et al. | |
| 5,659,362 A | 8/1997 | Kovac et al. | |
| 5,712,809 A | 1/1998 | Girod et al. | |
| 5,734,755 A | 3/1998 | Ramchandran et al. | |
| 5,768,429 A | 6/1998 | Jabbi et al. | |
| 5,822,003 A | 10/1998 | Girod et al. | |
| 5,870,310 A | 2/1999 | Malladi | |
| 5,898,881 A | 4/1999 | Miura et al. | |
| 5,923,375 A | 7/1999 | Pau | |

(Continued)

FOREIGN PATENT DOCUMENTS

| | | |
|---|---|---|
| WO | 9827742 | 6/1998 |
| WO | 9827742 A1 | 6/1998 |

OTHER PUBLICATIONS

Mark, Reduced Power Consumption for MPEG Decodign with LNS, 2002, IEEE Proceedings of the IEEE International Conference on Application-Specific Systems, Architectures, and Processors, pp. 1-11.*

(Continued)

*Primary Examiner* — David H Malzahn (57) ABSTRACT

A method and system for adaptive matrix trimming in an inverse discrete cosine transform (IDCT) operation. At least one row of an input matrix is accessed. At least one matrix element of the row having a value of zero is detected. During execution of an IDCT multiplication operation on the row for generating an output row, IDCT multiplication operation for a matrix element having a value of zero is skipped.

27 Claims, 8 Drawing Sheets

U.S. PATENT DOCUMENTS

| | | | |
|---|---|---|---|
| 6,021,420 A * | 2/2000 | Takamuki | 708/401 |
| 6,029,185 A | 2/2000 | Tonomura | |
| 6,160,920 A | 12/2000 | Shyu | |
| 6,167,092 A * | 12/2000 | Lengwehasatit | 708/402 |
| 6,189,021 B1 | 2/2001 | Shyu | |
| 6,223,195 B1 | 4/2001 | Tonomura | |
| 6,356,945 B1 | 3/2002 | Shaw et al. | |
| 6,421,695 B1 * | 7/2002 | Bae et al. | 708/402 |
| 6,445,829 B1 | 9/2002 | Shyu | |
| 6,459,738 B1 | 10/2002 | Wu et al. | |
| 6,751,721 B1 | 6/2004 | Webb, Jr. et al. | |
| 6,799,192 B1 * | 9/2004 | Handley | 708/402 |
| 6,996,645 B1 | 2/2006 | Wiedenman et al. | |
| 7,007,054 B1 | 2/2006 | Brady et al. | |
| 7,142,720 B1 | 11/2006 | Fukuda et al. | |
| 7,403,564 B2 | 7/2008 | Laksono | |
| 7,792,891 B2 | 9/2010 | Vainsencher et al. | |
| 2002/0015445 A1 | 2/2002 | Hashimoto | |
| 2002/0025002 A1 * | 2/2002 | Her | 375/240.16 |
| 2002/0041626 A1 | 4/2002 | Yoshioka et al. | |
| 2002/0118743 A1 | 8/2002 | Jiang | |
| 2003/0078952 A1 * | 4/2003 | Kim et al. | 708/401 |
| 2003/0141434 A1 | 7/2003 | Ishikawa et al. | |

OTHER PUBLICATIONS

Park, S., Kim, S., Kim, I., Byun K., Cha, J.J., Cho, H., "A Single-Chip Video/Audio Codec For Low Bit Rate Application"; ETRI Journal, vol. 22; No. 1; Mar. 2000; pp. 20-29.

Chen, T.; Huang Y.; Chen L.; "Analysis and Design Of Macroblock Pipelining For H.264/AVC VLSI Architecture"; Circuits and Systems, 2004. ISCAS '04; Proceedings of the 2004 International Symposium on vol. 2; No., pp. II-273-6; vol. 2 23-26; May 2004.

Naganuma, 1., et al.; "Single-Chip MPEG-2 422P@HL Codec LSI with Multi-Chip Configuration For Large Scale Processing Beyond HDTV Level", Design, Automation and Test in Europe Conference and Exhibition, Mar. 2003.

Mizuno, M. et al.; "A 1.5 W Single-Chip MPEG-2 MP@ML Video Encoder With Low Power Motion Estimation and Clocking", Solid State Circuits, IEEE Journal of, vol. 32, No. 11, pp. 1807-1816, Nov. 1997.

Wang, Shih-Hao; et al., "A Platform-Based MPEG-4 Advanced Video Coding (AVC) Decoder With Block Level Pipelining", Information, Communications and Signal Processing, 2003 and the Fourth Pacific Rim Conference on Multimedia. Proceedings of the 2003 Joint Conference of the Fourth International Conference on vol. 1, No., pp. 51-55 vol. 1; Dec. 2003.

Tu, C., Liang, J., and Tran, T. "Adaptive Runlength Coding", in IEEE Signal Processing Letters; vol. 10; No. 3; pp. 61-64; Mar. 2003.

The Merriam-Webster Dictionary. 2005 ed. Springfield, MA: Merriam-Webster Inc., 2005, p. 251.

* cited by examiner

— Prior Art —

FIG. 1A

— Prior Art —

FIG. 1B

-- Prior Art --

|     | write |     |     |     |
| --- | --- | --- | --- | --- |
|     | ⇓ | ⇓ | ⇓ | ⇓ |
| ⇐ | d11 | d12 | d13 | d14 |
| ⇐ | d21 | d22 | d23 | d24 |
| ⇐ | d31 | d32 | d33 | d34 |
| ⇐ | d41 | d42 | d43 | d44 | read

-- Prior Art --

METHOD AND SYSTEM FOR ADAPTIVE MATRIX TRIMMING IN AN INVERSE DISCRETE COSINE TRANSFORM (IDCT) OPERATION

RELATED U.S. APPLICATION

This application claims priority to the provisional patent application Ser. No. 60/499,044, entitled "ADAPTIVE TRIM ALGORITHM AND SPECIAL TRANSPOSE RANDOM ACCESS MEMORY FOR IDCT VLSI IMPLEMENTATION," with filing date Aug. 29, 2003, and assigned to the assignee of the present application.

FIELD OF THE INVENTION

Embodiments of the present invention relate to digital video image processing. More particularly, embodiments of the present invention relate to a method and system for adaptive matrix trimming in an inverse discrete cosine transform (IDCT) operation.

BACKGROUND OF THE INVENTION

Figure 1A:
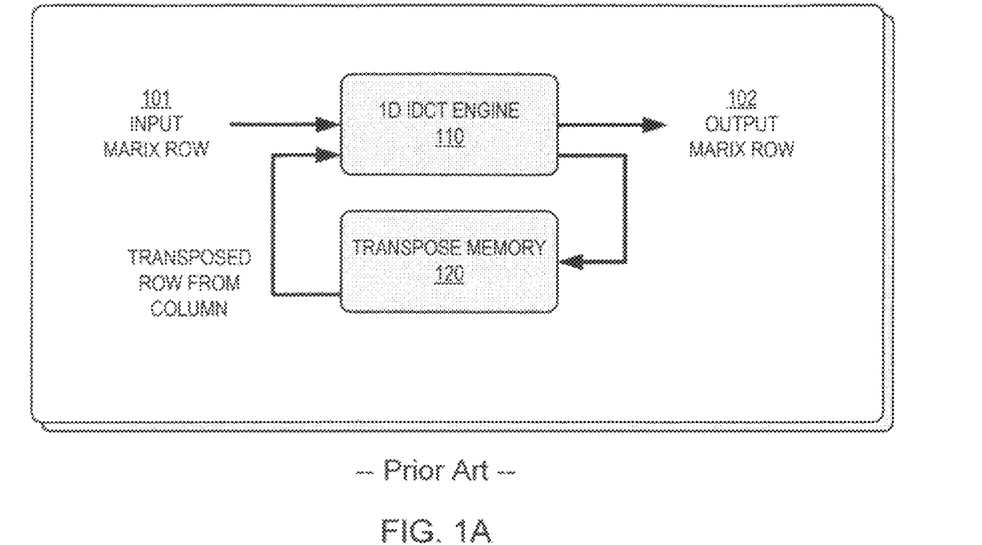
FIG. 1A illustrates a block diagram of an inverse discrete cosine transform (IDCT) processor, in accordance with the prior art.
Figure 1B:
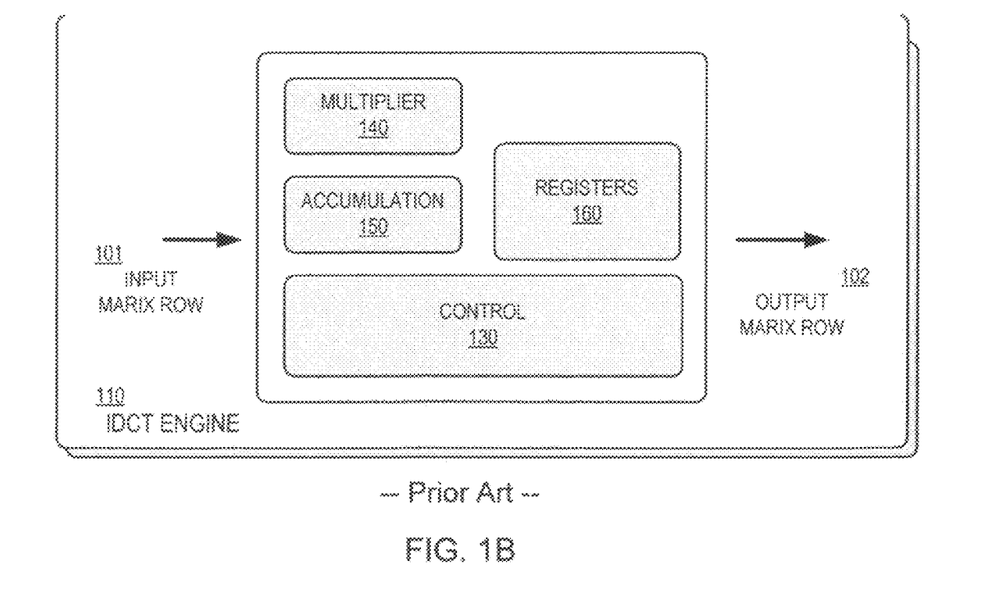
FIG. 1B illustrates a block diagram of a one-dimensional (1D) IDCT engine, in accordance with the prior art.

Inverse discrete cosine transformation (IDCT) is an algorithm that is commonly used in digital video image processing. Currently, IDCT operations require substantial computational overhead. For example, consider a two-dimension IDCT operation for an 8×8 macroblock of pixels. An input 8×8 matrix is organized into eight rows of eight data elements. With reference to FIG. 1A, a prior art IDCT processor 100 is shown. An input matrix is received, wherein data elements from each row 101 are fed into a one-dimensional (1D) IDCT engine 110, and then the result is stored back to a transpose memory 120. IDCT operations are performed on each input matrix row 101 at 1D IDCT engine 110 at multiplier 140 and accumulator 150 under the control of controller 130 in conjunction with registers 160, as shown in FIG. 1B.

Figure 1C:
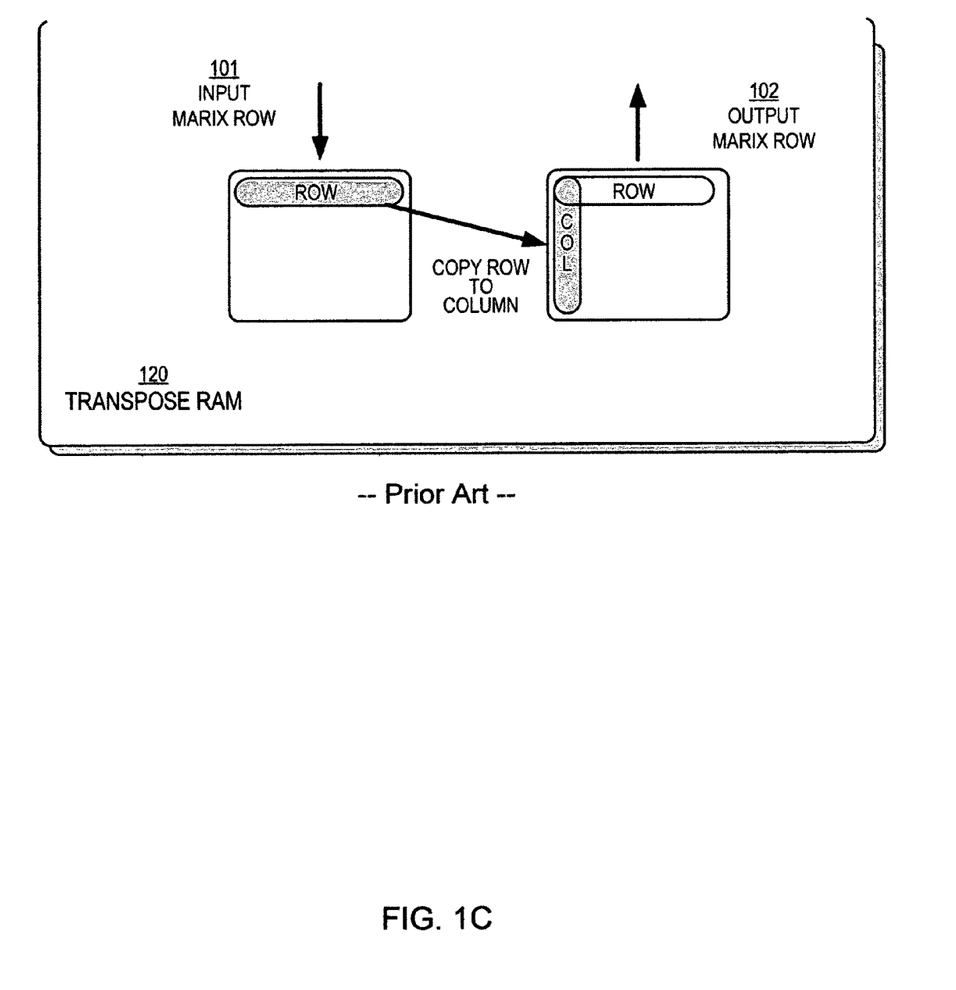
FIG. 1C illustrates a functional diagram illustrating the operation of a transpose random access memory (RAM) utilized in an IDCT processor, in accordance with the prior art.

After the operations on all eight rows are completed, the transpose memory 120 will be reorganized such that row data becomes column data, as shown in FIG. 1C. Then the transposed row data elements will again be inputted into 1D IDCT engine 100 for a second time to obtain output matrix rows 102 of a two-dimensional matrix as the final results of a two-dimensional inversed directional cosine transformation (IDCT) operation, as shown in FIG. 1A.

The operations can be illustrated by examining an input row of an 8×8 matrix to a 1D IDCT engine, e.g., input row—[x0 x1 x2 x3 x4 x5 x6 x7]. The input row is separated into two rows, e.g., a first row Xi—[x0 x2 x4 x6], and a second row Xe=[x1 x3 x5 x7]. Furthermore, an output row of the IDCT operation, e.g., output row—[o0 o1 o2 o3 o4 o5 o6 o7], is also separated into two rows, e.g., a first row Oi=[o0 o1 o2 o3], and a second row Oe—[o7 o6 o5 o4]. The correlations between the input rows and output rows can be expressed as shown in Equations 1 and 2:

$$Oi=(0.5)(P*Xi+Q*Xe) \quad (1)$$

$$Oe=(0.5)(P*Xi-Q*Xe) \quad (2)$$

where P and Q are 4×4 matrix of IDCT conversion constant. These operations are generally referred to as very large-scale integration (VLSI) IDCT operations. An example of a VLSI IDCT operation is described in "VLSI Design and Implementation of Different DCT Architectures for Image Compression," by Sherif T. Eid. As the major computations involved in such operation are multiplications, the complexity can be readily measured by a simply determining the number of multiplications required for completing the calculations as described above.

The computation of Oi and Oe according to Equations 1 and 2 can be carried out simultaneously with calculated P*Xi and Q*Xe for performing the computations. In order to generate the first set of computational data elements to transpose memory, it takes (16+16)*8=256 multiplication operations. For the purpose of generating complete computational results (e.g., two-dimensional), the total number of multiplication operations is 2*256=512. Assuming IDCT engine 110 has only one multiplier processing circuit, one adder and one accumulator, it will take at least 512 clock cycles to generate complete 8×8 result matrix.

Furthermore, the configuration and method of writing and retrieving data from conventional random access memory (RAM) for the purpose of carrying out a matrix transpose operation also requires extra large number of clock cycles. Specifically, the matrix transpose operation as that carried out in a conventional IDCT operation is implemented with a RAM that requires multiple clock cycles in first writing the data elements arranged as an array of row data then to retrieve the data in a sequential order arranged as an array of column data in order to transpose the matrix. The speed of data processing and display of image data are adversely affected due to these clock cycle requirements.

Figure 1D:
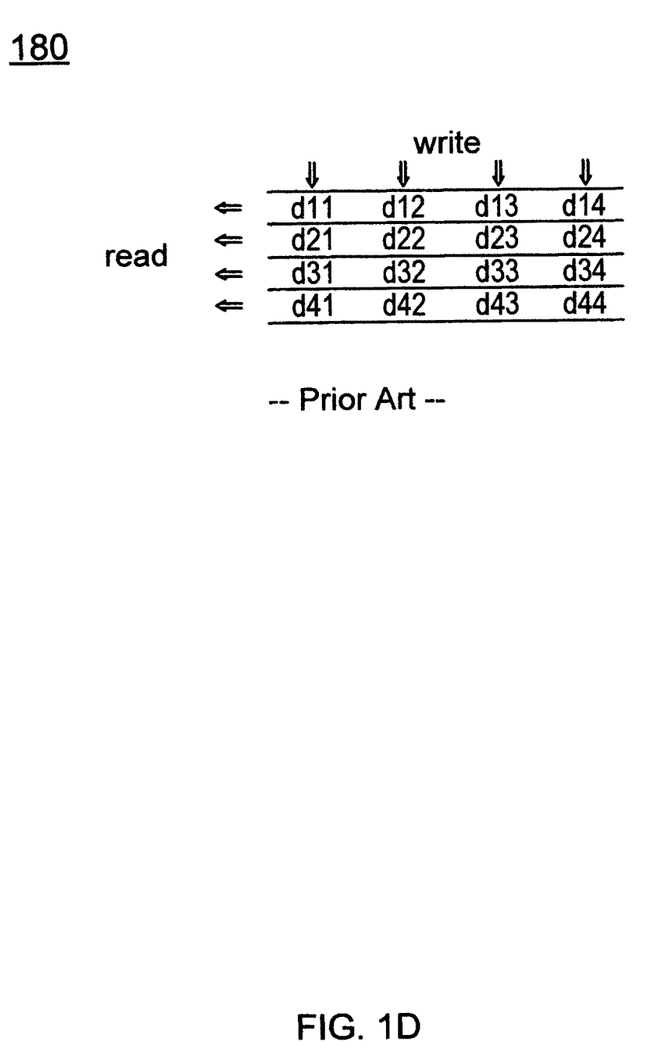
FIG. 1D illustrates a matrix transpose operation of an IDCT processor, in accordance with the prior art.

For example, consider a conventional 4×4 RAM including of four sets of 4×1 RAM where the first set of 4×1 RAM is employed to store an data array represented by [d11 d12 d13 d14] and the last set of 4×1 RAM stores data array represented by [d41 d42 d43 d44]. In a matrix transpose operation, the data array is first stored as a row and read out as a column. The operations are illustrated in matrix transpose operation 180 of FIG. 1D. Matrix transpose operation 180 requires four clock cycles to write four rows of data array into the 4×4 matrix. Similarly, using a conventional 8×8 RAM, an 8×8 matrix transpose operation requires eight clock cycles.

Accordingly, a need exists for a method or system for performing a more efficient inverse discrete cosine transform (IDCT) operation that applies an adaptive matrix element-trimming algorithm to eliminate unnecessary multiplications to reduce the wastes of computation resources. Furthermore, a need exists for a method or system for performing a more efficient IDCT operation that improves the configuration of the memory (e.g., RAM) by writing and retrieving data to restructure the transposed matrix such that the clock cycle requirement can be reduced.

SUMMARY OF THE INVENTION

In one embodiment, the present invention provides a method for adaptive matrix trimming in an IDCT operation. In one embodiment, the IDCT operation is performed according to a very large-scale integration (VLSI) implementation. At least one row of an input matrix is accessed. In one embodiment, the input matrix is an 8×8 pixel macroblock. At least one matrix element of the row having a value of zero is detected. During execution of an IDCT multiplication operation on the row to generate an output row, the IDCT multiplication operation is skipped for a matrix element having a value of zero. In one embodiment, the IDCT multiplication operation includes an IDCT accumulation operation.

In one embodiment, it is determined whether a transpose operation has been performed on the output row. If said transpose operation has not been performed on said output row, the output row is written to a transpose memory. In one embodiment, each element of the output row is written to successive rows of the transpose memory, wherein a successive element is offset by one column position in a successive row from the previous element.

In one embodiment, where the input matrix is not transposed, at least one row of the input matrix may be accessed by rearranging elements of the row into a corrected order, wherein each element of the row is stored in a transpose memory such that a successive element is offset by one column position in a successive row of the transpose memory from the previous element. The row is then read in the corrected order.

In another embodiment, the present invention provides an IDCT processor including an IDCT engine for accessing at least one row of an input matrix. In one embodiment, the input matrix is an 8×8 pixel macroblock. In one embodiment, the IDCT processor is configured according to VLSI architecture. The IDCT engine includes a multiplier for executing an IDCT multiplication operation on the row to generate an output row, and a controller for detecting at least one matrix element of the row having a value of zero, wherein the IDCT multiplication operation is skipped for a matrix element having a value of zero. In one embodiment, the IDCT engine further includes an accumulator for executing an IDCT accumulation operation on the row, such that the IDCT multiplication operation and the IDCT accumulation operation are for generating the output row.

In one embodiment, the IDCT processor also includes a transpose memory for storing the output row if the controller determines that a transpose operation has not been performed on the output row. In one embodiment, the transpose memory is operable to write each element of the output row to successive rows of the transpose memory, wherein a successive element is offset by one column position in a successive row from said previous element. In one embodiment, the transpose memory includes a re-multiplexer for rearranging elements of the row into a corrected order, in response to a read operation.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 2:
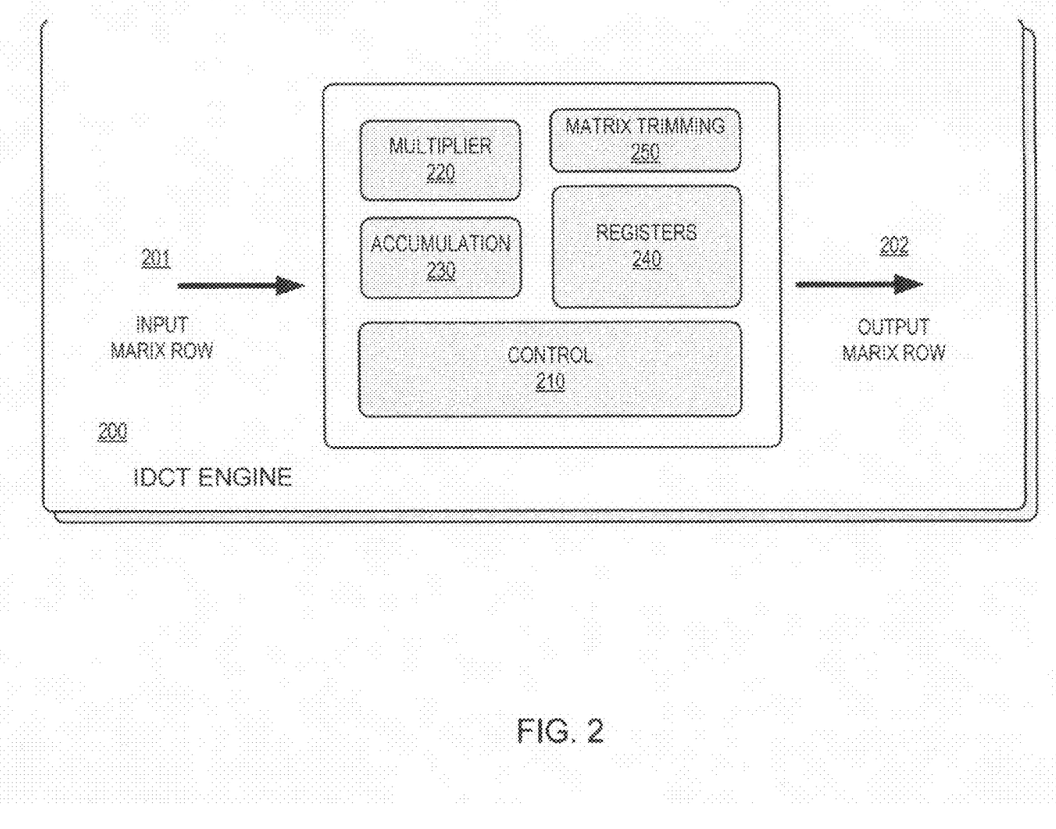
FIG. 2 illustrates a block diagram of an IDCT engine, in accordance with an embodiment of the present invention.

FIG. 2 illustrates a block diagram of an inverse discrete cosine transform (IDCT) engine 200, in accordance with an embodiment of the present invention. IDCT operations are performed on each input matrix row 201 at IDCT engine 200 at multiplier 220 and accumulator 230 under the control of controller 210 in conjunction with registers 240. IDCT engine 200 generates output matrix row 202. In one embodiment, IDCT engine 200 is configured according to a very large-scale integration (VLSI) architecture.

For each row of input data to IDCT engine 200, at least one of the input data elements could have a value of zero. For example, in an IDCT application employed in compression application, there is a considerable likelihood that there are many data elements having a value of zero. For the purpose of increasing the speed of IDCT computations, IDCT engine also includes matrix trimming module 250. Matrix trimming module 250 enables IDCT engine 200 to provide for adaptive matrix trimming to reduce computational overhead. It should be appreciated that the functionality of matrix trimming module 250 may be included within controller 210, and that matrix trimming module 250 is optional.

In one embodiment, before the actual transfer operation is carried out for input matrix row 201, a check is first made by controller 210 to determine if any of the data elements is zero. When a data element is zero, the multiplication and accumulation operations for that data element can be skipped. For example, for an 8×8 matrix, if multiplication and accumulation operations are performed for all data elements, thirty-two multiplications and accumulations are required for each row. A data element having a value of zero does not provide any data useful for the multiplication and accumulation operations, and thus may be skipped without affecting subsequent multiplication and accumulation operations, saving computational resources. Matrix trimming module 250 is operable to store the location of data elements having a value of zero, enabling controller 210 to allow these data elements to skip multiplication and accumulation operations.

For instance, assuming all the data elements for a row have a value of zero, only one clock cycle is required to make this determination. Assuming all the data elements of the input matrix are all zeros, then only sixteen clock cycles are required to make this determination rather than the maximum of 512 clock cycles. By implementing adaptive matrix trimming of the present invention, the clock cycles for processing an 8×8 input matrix can be reduced from the original 512 clock cycles to a number of clock cycles between sixteen and 512. In one embodiment, matrix trimming module 250 is a hardware implementation using a zero-determination circuit that can be employed to search and detect data elements of the input matrix having a value of zero, thus improving the processing speed of the IDCT operations. In another embodiment, matrix trimming module 250 is implemented as software code associated with controller 210.

Figure 3:
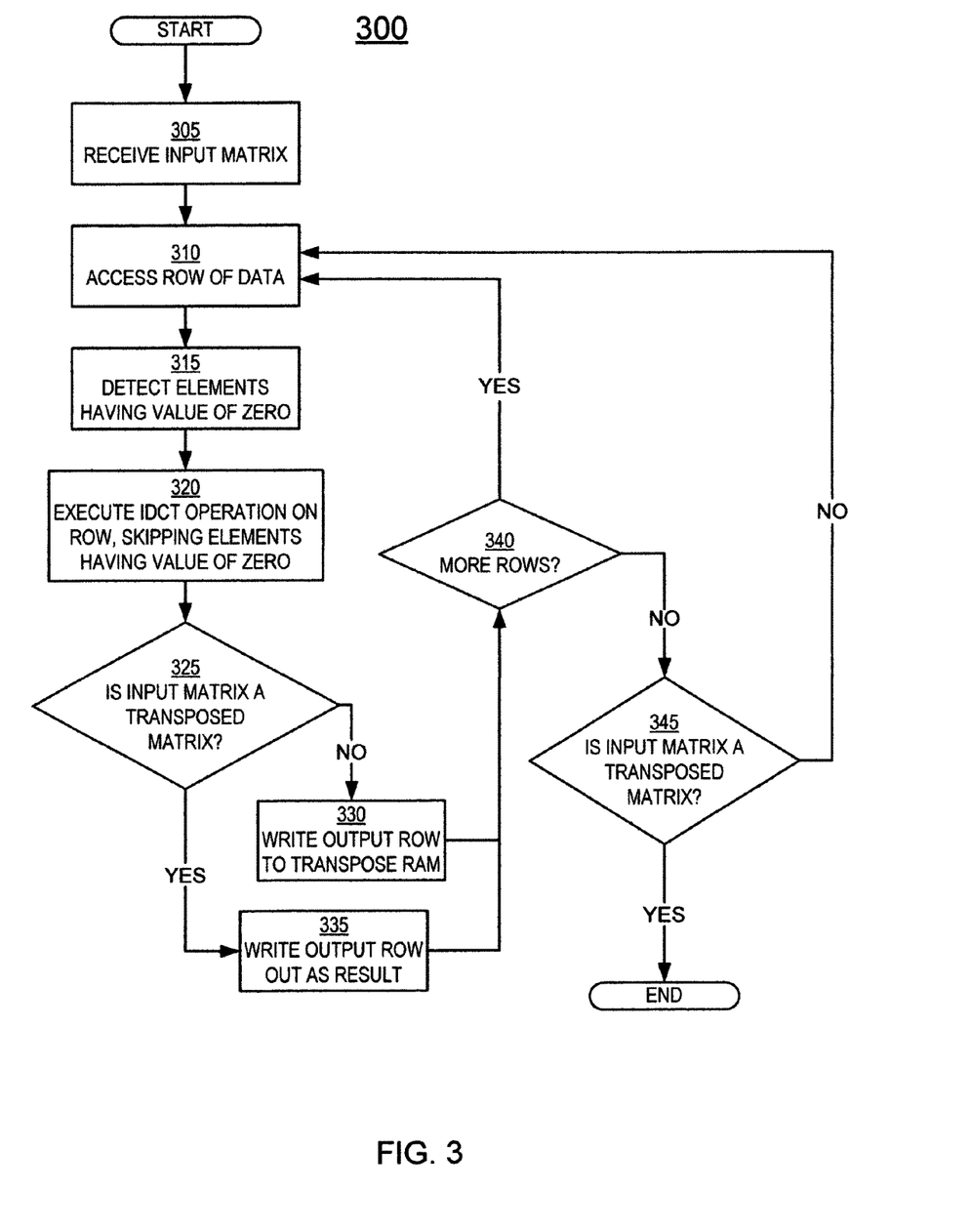
FIG. 3 illustrates a flowchart of a process for adaptive matrix trimming in an IDCT operation, in accordance with an embodiment of the present invention.

FIG. 3 illustrates a flowchart of a process 300 for adaptive matrix trimming in an IDCT operation, in accordance with an embodiment of the present invention. In one embodiment, the IDCT operation is performed according to a very large-scale integration (VLSI) implementation. In one embodiment, process 300 is carried out by processors and electrical components (e.g., IDCT engine 200 of FIG. 2) under the control of computer readable and computer executable instructions. In another embodiment, process 300 is carried out by a zero-determination circuit (e.g., matrix trimming module 250 of FIG. 2). Although specific steps are disclosed in process 300, such steps are exemplary. That is, the embodiments of the present invention are well suited to performing various other steps or variations of the steps recited in FIG. 3.

In one embodiment, process 300 provides an adaptive look-ahead matrix trimming process for reducing clock cycles and improving the efficiency of an IDCT engine. At step 305, data representing an input matrix is received, e.g., an 8×8 matrix. At step 310, the IDCT engine accesses a row of the data. At step 315, matrix elements having a value of zero are detected. At step 320, the IDCT engine executes an IDCT multiplication and accumulation operations on the row, and iteratively completes the multiplication and accumulation operations for all the elements of a row. In particular, the multiplication and accumulation operations are skipped when a matrix element has a value of zero.

At step 325, it is determined whether the input matrix has been transposed. In performing various IDCT operations on a matrix, the matrix is passed through the IDCT engine twice, in order to transpose the matrix into a correct orientation. A non-transposed matrix has completed one pass through the IDCT engine, while a transposed matrix has completed two passes through the IDCT engine. If the matrix has not been transposed, as shown at step 330, the output row is written to a transpose random access memory (RAM). Alternatively, if the matrix has been transposed, as shown at step 335, the output row is written out as a result.

At step 340, it is determined whether all the rows of the input matrix are processed. If there are more rows of the input matrix to process, process 300 returns to step 310 and performs steps 310 through 335 on another row of the data. Alternatively, if all the rows of the input matrix have been processed, process 300 proceeds to step 345 and the IDCT engines again check if the output matrix is transposed. If the output matrix has been transposed, the matrix is written out as a result, and process 300 ends. Alternatively, if the output matrix has not been transposed, process 300 returns to step 310, where the output matrix is processed (e.g., the output matrix is the new input matrix).

In one embodiment, the transpose RAM requires as many structures (e.g., data busses) as rows and elements in the matrix. For example, for an 8×8 matrix, adaptive matrix trimming requires looking ahead to the eight matrix elements in a row. Therefore, the transpose RAM has eight data structures. Furthermore, since the eight output matrix elements can be ready at the same time, the transpose RAM should be able to store them all in one clock cycle. In order to achieve time savings, the order of the data entries is arranged as shown in FIG. 4.

Figure 4:
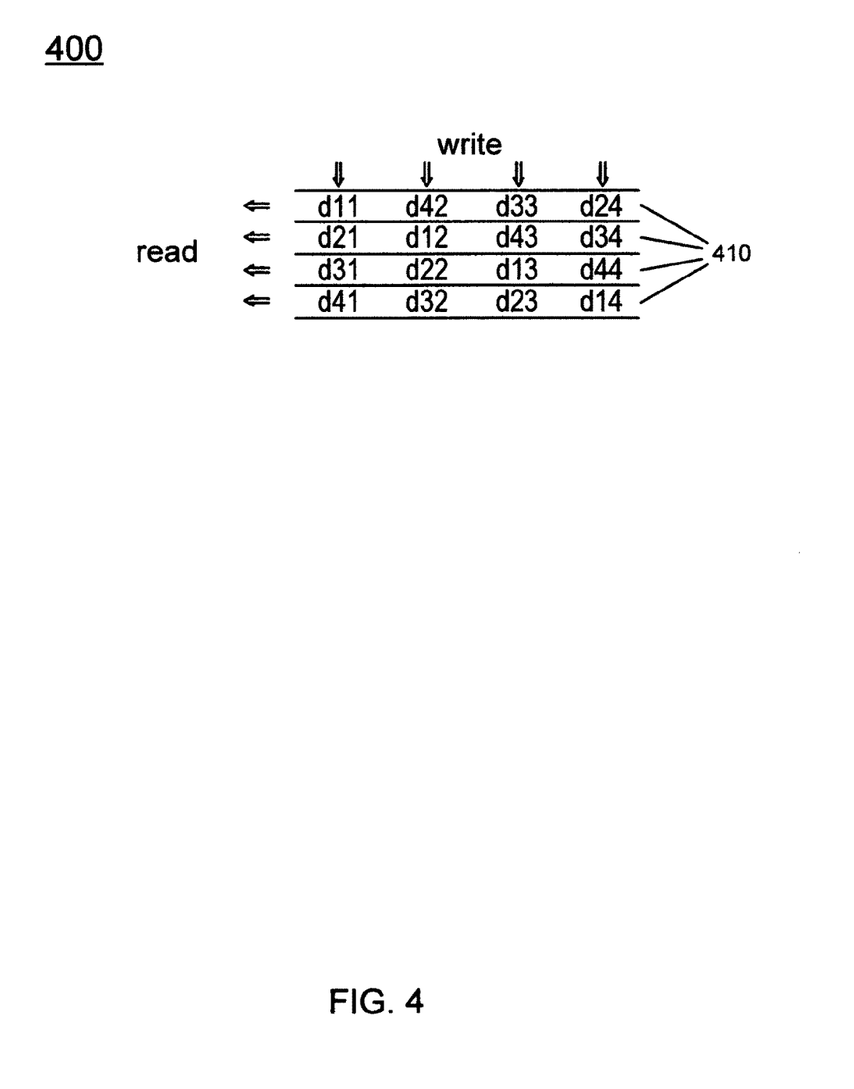
FIG. 4 illustrates a matrix transpose operation of an IDCT processor, in accordance with an embodiment of the present invention.

FIG. 4 illustrates a matrix transpose operation 400 of an IDCT processor, in accordance with an embodiment of the present invention. The data elements are written to the transpose RAM such that each element of the output row is written to successive structures 410 (e.g., rows) of the transpose RAM, wherein a successive element is offset by one column position in a successive row from the previous element. In other words, the data elements are written diagonally, wherein each output row has one data element in each transpose RAM structure 410.

Figure 5A:
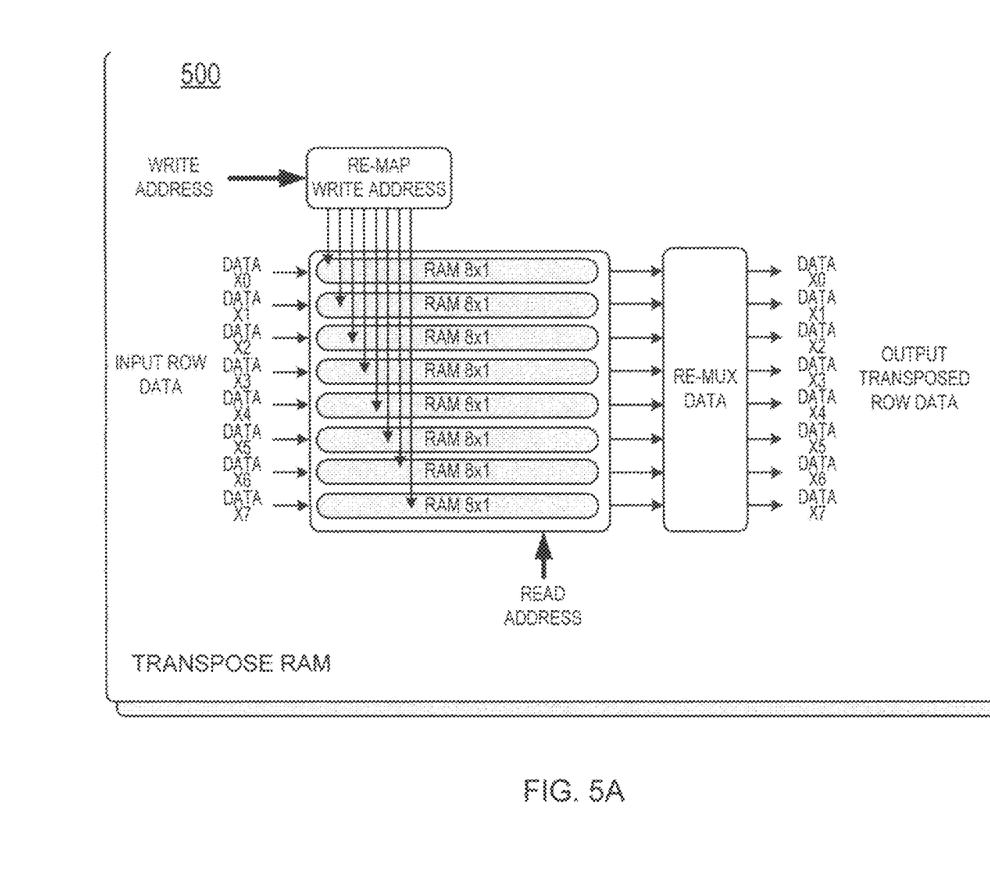
FIG. 5A illustrates a functional block diagram of writing data to a transpose RAM, in accordance with an embodiment of the present invention.

In order to complete the entry of data elements in one clock cycle it is necessary to linearly increase the address of the RAM to store sixteen data in one clock cycle, for an 8×8 matrix. Then, the data elements are retrieved according to a transposed order. FIG. 5A illustrates a functional block diagram of writing data to a transpose RAM 500 for an 8×8 two-dimensional IDCT operation, in accordance with an embodiment of the present invention. The structure of the transpose RAM 500 allows for simultaneous entry of eight data elements and retrieval of eight data elements without using extra clock cycles to carry out a transposing operation, since each data element is written to one of eight parallel 8×1 RAM structures.

Figure 5B:
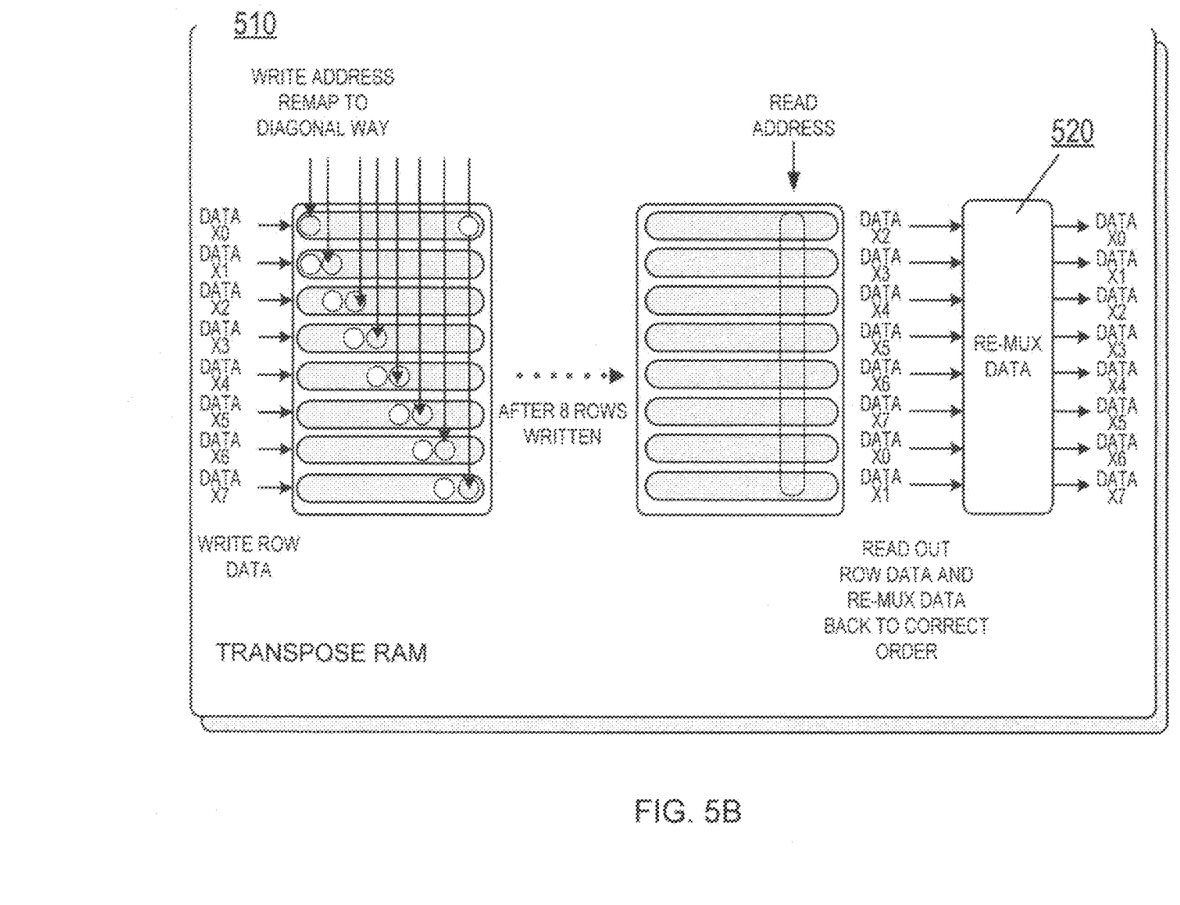
FIG. 5B illustrates a functional block diagram of reading data from a transpose RAM, in accordance with an embodiment of the present invention.

FIG. 5B illustrates a functional block diagram of reading data from a transpose RAM 510, in accordance with an embodiment of the present invention. Since the write address is arranged to write the matrix elements according to a diagonal order and the data for each column is readout each clock cycle then a rearrangement of the data for each column is carried out to obtain a transposed row data matrix. In one embodiment, the rearrangement of the data is carried out by re-multiplexer 520.

Embodiments of the present invention disclose a video image data processing device having an IDCT processor. In one embodiment, the present invention provides a video image data processing device having an IDCT processor. The IDCT processor includes an adaptive matrix trimming module for carrying out an IDCT matrix multiplication by skipping a multiplication operation for a matrix element having a value of zero.

In one embodiment, the IDCT processor includes a transpose RAM arranged in columns and rows having a writing means for writing input data in a diagonal order across the columns and rows. In one embodiment, the transpose RAM further includes a reading means for reading output data from each column from the RAM. In another embodiment, the transpose RAM further includes an output data re-multiplexer for rearranging an order of the output data read by the reading means for obtaining corrected order of the output data to construct a transposed IDCT output matrix.

The described embodiments provide a novel and improved device configuration and method for carrying out the IDCT operation by implementing an adaptively matrix trimming process by first determining if a matrix element of a IDCT matrix has a value of zero and skipping the multiplications and accumulation processes for that element. This adaptive matrix trimming process therefore eliminates unnecessary clock cycles and computing resources. In order to further reduce the required clock cycles, the operation for transposing the resulting IDCT output matrix is modified by arranging the writing addresses of a transpose RAM into a diagonal order and the readout address from each column right after the diagonally data elements are entered. Clock cycles are saved without requiring increase of the size of the RAM.

Embodiments of the present invention may be integrated into portable electronic devices, such as cellular telephones, personal digital assistants (PDAs), handheld computer systems, and laptop computer systems. By requiring fewer clock cycles in carrying out IDCT operations, the described embodiments require less power than previously necessary. Thereby, battery life may be extended in portable electronic devices, increasing usability and functionality.

Various embodiments of the invention, a method and system for adaptive matrix trimming in an IDCT operation, are thus described. While the present invention has been described in particular embodiments, it should be appreciated that the invention should not be construed as limited by such embodiments, but rather construed according to the below claims.

What is claimed is:

1. In a video image processor, a method for adaptive matrix trimming in an inverse discrete cosine transform (IDCT) operation, said method comprising:
   accessing at least one row of an input matrix;
   examining multiple elements of said row within a single clock cycle wherein said examining is directed at detecting at least one matrix element of said row having a value of zero; and
   during execution of an IDCT operation for rendering video on said row to generate an output row, skipping an IDCT multiplication operation and an accumulation operation for a matrix element having a value of zero; and
   during a first pass, writing each element of said row to successive rows of a transpose memory within a single clock cycle, wherein a successive element is offset by one column position in a successive row from a previous element and wherein said transpose memory is operable to output a transposed row.

2. The method as recited in claim 1 wherein said IDCT operation is performed according to a very large-scale integration (VLSI) implementation.

3. The method as recited in claim 1 wherein said IDCT multiplication operation includes an IDCT accumulation operation.

4. The method as recited in claim 1 wherein said input matrix is an 8×8 pixel macroblock.

5. The method as recited in claim 1 further comprising:
   determining whether a transpose operation has been performed on said output row; and
   if said transpose operation has not been performed on said output row, writing said output row to said transpose memory.

6. The method as recited in claim 5, wherein said writing said output row to said transpose memory comprises writing each element of said output row to successive rows of said transpose memory, wherein a successive element is offset by one column position in a successive row from said previous element.

7. The method as recited in claim 1, wherein said input matrix is not transposed, and wherein said accessing at least one row of said input matrix further comprises:
   rearranging elements of said row into a corrected order, wherein each element of said row is stored in a transpose memory wherein a successive element is offset by one column position in a successive row of said transpose memory from said previous element; and
   reading said row in said corrected order.

8. The method as recited in claim 1 wherein said multiple elements comprise a complete row of said input matrix.

9. The method as recited in claim 1 wherein a row of zeros is determined in a single clock cycle.

10. An inverse discrete cosine transform (IDCT) processor comprising:
   an IDCT engine for accessing at least one row of an input matrix, said IDCT engine operable to execute a method for rending an image comprising:
      a multiplier for executing an IDCT multiplication operation for rendering video on said row to generate an output row; and
      a controller for examining multiple elements of said row within the a single clock cycle and for detecting at least one matrix element of said row having a value of zero, wherein said IDCT multiplication operation and an accumulation operation is skipped for a matrix element having a value of zero and wherein said controller further during a first pass writes each element of said row to successive rows of a transpose memory within a single clock cycle, wherein a successive element is offset by one column position in a successive row from a previous element and wherein said transpose memory is operable to output a transposed row for rendering an image.

11. The IDCT processor as recited in claim 10 wherein said IDCT processor is configured according to a very large-scale integration (VLSI) architecture.

12. The IDCT processor as recited in claim 10 wherein said IDCT engine further comprises an accumulator for executing an IDCT accumulation operation on said row, such that said IDCT multiplication operation and said IDCT accumulation operation are for generating said output row.

13. The IDCT processor as recited in claim 10 wherein said input matrix is an 8×8 pixel macroblock.

14. The IDCT processor as recited in claim 10 wherein said transpose memory is for storing said output row if said controller determines that a transpose operation has not been performed on said output row.

15. The IDCT processor as recited in claim 14, wherein said transpose memory is operable to write each element of said output row to successive rows of said transpose memory, wherein a successive element is offset by one column position in a successive row from said previous element.

16. The IDCT processor as recited in claim 15, wherein said transpose memory includes a re-multiplexer for rearranging elements of said row into a corrected order, in response to a read operation.

17. A computer-readable storage medium having computer-readable program code embodied therein for causing a computer system to perform a method for adaptive matrix trimming in an inverse discrete cosine transform (IDCT) operation for rendering video content, said method comprising:
   accessing at least one row of an input matrix;
   examining multiple elements of said row within a single clock cycle wherein said examining is directed at detecting at least one matrix element of said row having a value of zero; and
   during execution of an IDCT multiplication operation for rendering video on said row to generate an output row, skipping said IDCT multiplication operation and an accumulation operation for a matrix element having a value of zero; and
   during a first pass, writing each element of said row to successive rows of a transpose memory within a single clock cycle, wherein a successive element is offset by one column position in a successive row from a previous element and wherein said transpose memory is operable to output a transposed row.

18. The computer-readable storage medium as recited in claim 17 wherein said IDCT operation is performed according to a very large-scale integration (VLSI) implementation.

19. The computer-readable storage medium as recited in claim 17 wherein said IDCT multiplication operation includes an IDCT accumulation operation.

20. The computer-readable storage medium as recited in claim 17 wherein said input matrix is an 8×8 pixel macroblock.

21. The computer-readable storage medium as recited in claim 17 wherein said method further comprises:
   determining whether a transpose operation has been performed on said output row; and
   if said transpose operation has not been performed on said output row, writing said output row to said transpose memory.

22. The computer-readable storage medium as recited in claim 21, wherein said writing said output row to said transpose memory comprises writing each element of said output row to successive rows of said transpose memory, wherein a successive element is offset by one column position in a successive row from said previous element.

23. The computer-readable storage medium as recited in claim 17, wherein said input matrix is a transposed matrix, and wherein said accessing at least one row of said input matrix further comprises:
    rearranging elements of said row into a corrected order, wherein each element of said row is stored in a transpose memory such that a successive element is offset by one column position in a successive row of said transpose memory from said previous element; and
    reading said row in said corrected order.

24. In a video processing device, a method for performing an inverse discrete cosine transform (IDCT) operation, said method comprising:
    accessing at least one row of an input matrix;
    examining multiple elements of said row within a single clock cycle;
    determining whether a transpose operation has been performed on said row; and
    if said transpose operation has not been performed on said row, writing said row to a transpose memory within a single clock cycle, such that each element of said row is written to a successive row of said transpose memory, wherein a successive element is offset by one column position in a successive row from said previous element and wherein said transpose memory is operable to output a transposed row for rendering video.

25. The method as recited in claim 24 further comprising accessing at least one row of said input matrix.

26. The method as recited in claim 25 wherein said accessing at least one row of said input matrix further comprises:
    rearranging elements of said row into a corrected order; and
    reading said row in said corrected order.

27. The method as recited in claim 24 wherein said transpose memory is operable to receive input rows.

* * * * *